United States Patent Office 2,927,874 Patented Mar. 8, 1960

2,927,874

PROCESS FOR PRODUCING ALUMINUM SURFACE COATINGS

George H. Pimbley, Inglewood, Calif., assignor to Turco Products, Inc., Los Angeles, Calif., a corporation of California No Drawing. Application August 14, 1958 Serial No. 754,935

19 Claims. (Cl. 148—6.27)

This application is a continuation-in-part of my co-pending applications Serial Nos. 550,825, filed December 5, 1955, now Patent No. 2,868,679; 647,933, filed March 25, 1957; and 710,402, filed January 22, 1958.

This invention relates to the art of chemically coating aluminum surfaces, and particularly to the production of substantially colorless and corrosion resistant coatings upon such surfaces. Aluminum articles containing such coatings are particularly adapted for exterior usage such as, for example, aluminum house siding. The invention is especially concerned with novel procedure for producing improved substantially colorless surface coatings on aluminum surfaces. The term "aluminum" as employed herein is intended to denote pure aluminum, commercial grade aluminum containing small amounts of other materials, and aluminum alloys, i.e., those in which aluminum predominates.

In the prior art many methods are known of producing chemical films on aluminum surfaces, some of which have been commercially advantageous and have been widely practiced for many years past. Among these are the formation of artificial oxide coatings by means of electric current in chemical baths, the immersion of clean aluminum surfaces in alkaline baths containing oxidizing compounds whereby oxide type coatings are produced, and immersion in acidic baths containing an acid which attacks aluminum, together with other components effective to form a fixed integral film or coating upon the surface, the coating produced by the latter procedure being termed a "conversion coating." It is the latter class of coatings to which the present invention particularly relates. A brief description of this category of chemical coatings on aluminum is given below.

When an object having a surface of aluminum is cleaned free of grease and other surface soil, and is then immersed in or otherwise contacted with a solution containing anions of an acid which attacks aluminum, such as hydrofluoric acid, together with dichromate and hydrogen ions, a chemical reaction occurs which results in a fixed, integral film upon the aluminum surface. The precise nature of this reaction, and of the resulting film is not known. Probably some of the aluminum is dissolved, bringing about an increase of pH at the interface between the aluminum surface and bath liquid. The conversion coating that results is probably a gel-like amorphous complex of unknown state of chemical composition and physical structure. Generally, these coatings are thin, smooth, non-crystalline, relatively adherent and flexible, moderately lustrous, and are of yellow color, with more or less red, blue and greenish iridescence. The exact shade of color and degree of lustre differ greatly, according to which alloy of aluminum is being processed and according to the details of the processing procedure.

Chemical conversion coatings of the kind described, and as known in the prior art, have been found sufficiently advantageous to warrant increasing use by airplane manufacturers and other industrial fabricators of aluminum, as well as for building purposes. The procedures for application of such coatings have certain attractive features, including simplicity, low processing temperatures, brief contact time and feasibility of spray application.

In many instances it is desirable to produce a colorless or almost colorless conversion coating without impairing the other properties of the coating, for example, its corrosion resistance, smear-proofness and uniformity.

One object of the invention is to remove color from aluminum conversion coatings.

Another object is to produce substantially colorless coatings or films on aluminum surfaces.

Another object is the provision of aluminum conversion coatings of reduced coloration and having good corrosion resistance.

Yet another object is to provide a process for removing practically all of the color from aluminum conversion coatings without detrimental effects on the corrosion resistance of the coating.

A still further object is the provision of procedure for simple, rapid and inexpensive treatment of aluminum for production of aluminum conversion coatings which are substantially free of color.

Other objects and advantages of the invention will be apparent from the following description of my invention.

I have found that by treatment of a colored conversion coated aluminum article with solutions containing certain water soluble color discharge agents, I can produce a substantially colorless conversion coating having good to superior corrosion resistance properties. The color discharge agents suitable for use in my process are those possessing certain properties by which they operate to remove substantially all yellow and related coloration from conversion coated aluminum surfaces, whether freshly formed or previously produced, within conveniently short time periods and at relatively low temperatures, without detriment to the appearance of the conversion coating or to its corrosion resistance and paint bonding qualities. By the term "colorless" or "substantially colorless" coatings, I mean to include coatings having a very pale or barely perceptible coloration as well as coatings which appear colorless, i.e., are transparent to show the color of the underlying aluminum without any substantial added tinctorial effect.

The yellow conversion coating possesses its predominant yellow color due, it is believed, to retention of a yellow chromophor in the form of hexavalent chromium compound in the film following the conversion coating operation in the presence of hexavalent chromium ion. I have found that certain soluble agents have the ability to penetrate the conversion film and to react chemically with the hexavalent chromium present to discharge the yellow chromophor and form substantially colorless products. I shall hereafter refer to these agents as "color discharge agents." No yellow color or effect of yellow color in the treating solution containing the color discharge agent is noticeable or perceptible, indicating a true chemical reaction between my color discharge agent and the yellow hexavalent chromium compound in the conversion film. The color discharge agents employed in the invention for this purpose are those which on formation of a 2% solution of the agent and immersion therein of a colored conversion coating at a treatment temperature of 120° F. for a period not more than 15 minutes, produces a visible discoloration, or removal of color, from the conversion coating. The color discharge agents utilized in the invention are also preferably free of any tendency to form insoluble colored compounds with hexavalent chromium.

I prefer to employ such color discharge agents according to the invention, which lend themselves readily to convenient processing methods, and perform their function within a time period of about 2 to about 15 minutes at a temperature only moderately above room temperature, preferably between about room temperature and 120° F.

I have found that color discharge agents having the properties noted above and suitable for producing substantially colorless aluminum conversion coatings according to the invention, include inorganic and organic compounds. Preferably I utilize certain classes and types of color discharge agents having the properties noted above. These include soluble sulphur-containing compounds, soluble phosphorous-containing compounds, soluble ferrocyanides, soluble divalent and trivalent chromium compounds, hydroquinone, quinhydrone, and hydrazine compounds. Illustrative specific examples of the groups of compounds noted immediately above are ammonium and alkali metal thiosulphates and sulphites, ammonium and alkali metal phosphites and hypophosphites, phosphorous acid, ammonium and alkali metal ferrocyanides, chromous oxalate, chromic citrate, hydrazine hydrate, hydrazine sulfate and other soluble hydrazine salts, and the like. Other groups of compounds which may be useful for the process of this invention but which are less preferred include soluble ferrous compounds such as ferrous sulphate, and ammonium and alkali metal hypochlorites.

Preferred specific color discharge agents suitable for use in the invention are as follows:

TABLE 1

Potassium ferrocyanide
Sodium hypophosphite
Sodium thiosulphate
Hydroquinone
Chromic nitrate
Hydrazine sulphate
Phosphorous acid It was found that the first five compounds listed in the table above all functioned properly and efficiently to substantially discharge the yellow color from yellow conversion films on aluminum, for example, from 3003 and 2024 aluminum alloys, when such yellow conversion coated surfaces were immersed in 2% solutions of each of said compounds at temperatures of from about 70° F. to about 120° F. and for periods of time up to about 15 minutes. The surfaces thus decolorized, after waters rinsing and drying, were then subjected to salt spray tests for timed periods up to 700 hours, and were found to possess excellent corrosion resistance by such tests, fully equal to that of a yellow conversion coated surface not treated in the above color discharge baths.

In similar tests made with hydrazine sulphate and phosphorous acid, it was found that hydrazine sulphate produced a somewhat better discharge of the yellow conversion coating than in the case of the first five compounds of Table 1, with fairly good corrosion resistance obtained in the resulting decolorized film, and that phosphorous acid as color discharge agent produced a color discharge comparable to the first five compounds of Table 1, with fair corrosion resistance of the substantially colorless film.

The nature of the chemical reaction between my color discharge agents is not presently understood. Whatever the reaction may be, such agents appear to form reaction products with the hexavalent chromium, which are substantially colorless or have a coloration much less perceptible than the original yellow color. As aforementioned this is indicated by my observation that the solution of my discharge agent following treatment of conversion coatings therein, remains substantially free of any yellow coloration.

In contrast to the chemical action of my decolorizing agents on the hexavalent chromium compounds of the aluminum conversion coating, when water alone is employed for this purpose, the water acts simply to leach out the hexavalent chromium, as indicated by the yellow coloration of the solution following treatment therein of the conversion coating.

By employment of the invention process, the color can be discharged from thicker conversion coatings and in less time than in the case of the use of water alone, and the resulting decolorized coating according to the invention is substantially unimpaired as regards corrosion resistance, whereas use of water under these conditions results in impairment of the conversion coating. On freshly formed coatings, the results employing my color discharge agents are generally superior to the use of water as regards removal of color from the yellow conversion coating, even when employing lower temperatures and shorter periods of treatment than in the case of water, and the corrosion resistance of the resulting substantially colorless film utilizing my color discharge agents is fully comparable to that obtained when employing water under these circumstances. While it is preferred to carry out treatment with the color discharge agents of the invention on a freshly formed conversion coating for best results, satisfactory results can also be achieved on old conversion coatings, that is, those formed substantially prior to the time of treatment with my color discharge agents. This is not possible using water alone. In the latter case, an inordinately long period of time and high treatment temperature are required to remove any substantial amount of coloration, and during such prolonged period of rigorous treatment using water alone, the conversion coating is impaired.

A comparison of the effect of my color discharge agents on yellow aluminum conversion coatings is given in Table 2 below. In this table, color discharge effects are given in "degrees." First degree indicates a strong remaining irridescent color tinge, i.e. tinges of red, green or blue; second degree indicates moderate remaining iridescent color tinges of the above type; third degree indicates only slight remaining iridescence of this nature; and fourth degree indicates no perceptible remaining color or residual tinge. The comparison was made as against a control of distilled water, which produced a first to second degree color discharge. Tests were made using 2% aqueous solutions of the agents noted in Table 2, except in the case of phosphorous acid and hydrazine hydrate, wherein concentrations of 0.5% and 0.2% were employed, respectively. In each case the time of treatment with the solution of color discharge agent was 15 minutes and temperature of treatment of about 120° F. Time between the conversion coating bath for production of the yellow conversion coating and treatment in the respective baths of my color discharge agents was 15 minutes in each case.

TABLE 2

| Color Discharge Agent: | Color discharge effect, as "degrees" |
|---|---|
| 1. Potassium ferrocyanide | 3rd degree. |
| 2. Sodium hypophosphite | do. |
| 3. Sodium thiosulphate | do. |
| 4. Hydroquinone | do. |
| 5. Phosphorous acid | do. |
| 6. Chromic nitrate | do. |
| 7. Hydrazine sulphate | 4th degree. |
| 8. Hydrazine hydrate | 3rd degree. |

It is noted from Table 2 that among those compounds listed therein, hydrazine sulphate produced the best color discharge results, namely a 4th degree color discharge. The others produced a third degree color discharge in the nature of slight iridescence, but considered good. All of the color discharge agents of Table 2 showed results superior to use of water alone.

As to corrosion resistance as measured by salt spray tests, the corrosion resistance of the coatings treated with agents 1 to 4, 6 and 8 was particularly good.

The conversion coating compositions and baths used in producing the initially colored conversion coating include hydrogen, halogen-containing, e.g. fluorine-containing, and dichromate ions. Such baths may also include other ions, such as hexavalent chromium ions. A typical prior art conversion coating bath can be, for example, an aqueous solution containing sodium fluoride, potassium dichromate and an acid such as nitric acid. For best results, I prefer to employ the after-treatment process of the invention in conjunction with the conversion coating compositions and processes of my above pending applications, Serial Nos. 550,825 and 710,402.

The conversion coating baths disclosed in Serial No. 550,825 include aqueous solutions containing cations of beryllium, magnesium, calcium, strontium or barium. The entire disclosure of my copending application, Serial No. 550,825, with respect to the composition of such baths is incorporated herein by reference.

The conversion coating baths disclosed in Serial No. 710,402 include aqueous solutions containing one or more than one of the cations of zinc, cadmium or mercury. The entire disclosure of my copending application Serial No. 710,402 with respect to the composition of such baths is incorporated herein by reference.

In preferred practice of the invention, the aluminum surfaces of the part preferably are first cleaned free of grease and soils by conventional methods, using cleaning agents known to be effective and safe on aluminum. Cleaning residues are removed by rinsing with water, usually hot water.

If the aluminum part has an obstructive oxide coating, the surface coating is next deoxidized. This step may or may not be employed, depending upon the particular alloy and stock of aluminum being processed. Certain alloys, such as 61-S usually bear a surface skin of oxide, of such a nature that it is resistant to the formation of the conversion film. In such cases the oxide film must be removed, after the cleaning operation, and before contact with the conversion coating solution or bath. This oxide film removal can be accomplished by various solutions usually containing a large proportion of compound having the $SO_4$ radical, a moderate propertion of hexavalent chromium compound, and a small proportion of fluorine compound. For aluminum alloys having considerable proportions of silicon, it is beneficial to include nitric acid in the deoxidizing treatment, either as an ingredient of the deoxidizing bath or of a separate bath employed in conjunction with the former. A deoxidizing solution which may be used is as follows:

| | Grams |
|---|---|
| Sodium bisulphate | 57.5 |
| Ammonium bifluoride | 1.0 |
| Potassium dichromate | 16.5 |
| Water to make one liter. | |

The surfaces of the aluminum articles are immersed in or otherwise contacted with the above solution for say five to eight minutes, at temperatures in the approximate range of 75–90° F. The surfaces are then thoroughly rinsed with cold water.

The work surfaces are then immersed in or otherwise contacted with the conversion coating solution or bath, which can be made up, for example, according to my above applications Serial Nos. 550,825 or 710,402. The temperature of the bath may range from about 75 to 110° F., the preferred temperature range being about 80–90° F. for dipping, and about 90–100° F. for spray application. The time period of contact may range, for example, from 30 seconds to 10 minutes; the preferred ranges are 2 to 5 minutes for dipping, and 1 to 2 minutes for spraying.

The decolorizing baths of my invention for producing substantially colorless conversion coatings may contain from about 0.1 to about 100 grams per liter of solution, preferably about 1 to about 50 grams per liter, and most desirably from about 2 to about 20 grams per liter, of the above described color discharge agents. The aluminum part on which the color conversion coating is formed can be immersed in a solution of the aforementioned color discharge agents for about 2 to 30 minutes, usually about 15 minutes. Such solutions may be used cold or preferably warm, for example, from about 100 to 120 deg. F., the temperature preferably not exceeding 140 deg. F. The work is then water rinsed and dried. If desired, an intervening water rinse may be advantageously employed between the conversion coating solution treatment and the treatment in the solution of color discharge agents according to the invention, but such rinse is optional.

The following examples illustrate practice of the invention.

*Example 1*

A piece of 3003 aluminum was dipped in a conversion coating bath formulated as follows for a period of 25 minutes, about 5 times the normal conversion treating time:

| | Grams |
|---|---|
| Calcium chromate | 7.94 |
| Sodium fluoborate | 2.52 |
| Sodium molybdate | .74 |
| Nitric acid, 40 deg. Bé. | 7.34 |
| Water to make 1 liter. | |

A very deep golden colored film was obtained on the aluminum part.

The film was rinsed with water and then dipped in a solution at about 120° F. of water containing 0.5% hydrazine sulphate by weight. The conversion coating was rendered substantially colorless in about 4 minutes. When exposed to salt spray the film showed no appreciable attack after 500 hours exposure, thus exhibiting satisfactory corrosion resistance.

*Example 2*

The procedure of Example 1 was repeated in three separate instances, but substituting in each instance for the aqueous hydrazine sulphate solution of Example 1, 2% solutions in water of each of potassium ferrocyanide, sodium hypophosphite, sodium thiosulphate and phosphorus acid. The phosphorous acid acted nearly as rapidly as the hydrazine sulphate of Example 1, and the other materials noted above acted somewhat less rapidly. All of these materials resulted in a conversion coating having only slight iridescence and all of the tests showed good corrosion resistance when subjected to 500 hours of salt spray exposure. The corrosion resistance of the coatings employing these materials, particularly the ferrocyanide, hypophosphite and thiosulphate compounds was somewhat superior to the corrosion resistance of the decolorized coating of Example 1.

Examples 1 and 2 show that even where a deep coloration is present in the conversion coating, the color discharge agents of the invention function in a short treating time to substantially discharge the color of the coating without adversely affecting corrosion resistance.

*Example 3*

A conversion coating formulation consisting of the ingredients listed below was prepared.

| | Grams |
|---|---|
| Beryllium hydroxide, $Be(OH)_2$ | 3.27 |
| Chromium trioxide, $CrO_3$ | 7.60 |
| Nitric acid, 40 deg. Bé. | 0.84 |
| Sodium fluoborate, $NaBF_4$ | 3.78 |
| Sodium molybdate, $Na_2MoO_4$ | 1.12 |
| Water to make 1 liter. | |

A 2024 aluminum alloy was immersed in this solution for about 5 minutes, producing a yellow conversion coating.

The resulting coating was rinsed and then immersed in a solution of 2% by weight of hydroquinone at a temperature of about 120 deg. F. for about 15 minutes.

The part was then rinsed and dried, resulting in a substantially colorless conversion coating of good salt spray resistance.

*Example 4*

A procedure similar to Example 3 can be carried out except that in place of hydroquinone, the same amount of chromic nitrate may be alternatively employed to obtain results similar to those of Example 3.

*Example 5*

A formulation consisting of the ingredients listed below was prepared.

| | Percent by weight |
|---|---|
| $ZnSiF_6 \cdot 6H_2O$ | 48.2 |
| $CrO_3$ | 40.0 |
| Boric acid (powder) | 11.8 |
| Total | 100.0 |

The above mixture when kept in closed glass containers remains as a dry, yellow-tan colored, free-flowing powder, the chromium trioxide appearing as small pieces of dark red-brown color.

A processing bath was prepared by adding the above formulation to water in an amount of 1½ ounces per gallon of solution. The bath had a pH of 1.6 without requiring the addition of acid. Panels of 2024 aluminum alloy treated in this solution produced strong, bright yellow conversion films with the bath at about room temperature, within 3 to 5 minutes contact time.

By immersing the resulting coating in a solution of 2% of sodium hypophosphite for about 15 minutes a substantially colorless conversion coating of good corrosion resistance is obtainable.

It will of course be understood that the concentration of my color discharge agents employed in the working solutions, and also the time of treatment of the aluminum article in such baths can vary, depending, for example, upon the particular agent employed, the operating temperature of the solution, the nature and thickness of the conversion coatings formed and the nature of the aluminum article being treated, and especially on the degree of coloration imparted to the coating in the conversion coating bath.

If desired, other materials may be included in the treatment bath, in addition to the color discharge agents described above. Thus, for example, I may incorporate wetting agents, such as an alkyl phenolethylene oxide condensate, or an alkyl aryl sulphonate, e.g. an alkyl benzene sulfonate wherein the alkyl group contains from about 12 to about 18 carbon atoms, in such baths to increase the effectiveness thereof, although these additives are not required.

While the above procedures and solutions containing the reducing agents of the invention have been mostly described in connection with treatment of the aluminum parts by dipping application in such solutions or baths, the aluminum parts may also be treated by spraying, brushing or swabbing applications of such solutions.

From the foregoing, it is seen that I have developed a process for rendering aluminum conversion coatings substantially colorless, while at the same time enhancing the smear-proofness, uniformity, thickness, toughness and corrosion resistance of the coating. The protective coatings of this invention are useful where it is desired to retain the bright, lustrous, colorless appearance of metallic aluminum. Aluminum conversian coatings treated by this process may be painted, or may be coated with clear organic films, or given other supplementary finishes. It is especially important that the unpainted surfaces have adequate corrosion resistance, and where a paint is to be applied to the surface of the coating, the coated surface should also have adequate adhesive properties to firmly bond with paints and other supplementary finishes. My process produces coatings possessing these qualities.

While I have described particular embodiments of my invention for the purpose of illustration, it should be understood that various modifications and adaptations thereof may be made within the spirit of the invention as set forth in the appended claims.

I claim:

1. A process for producing a substantially colorless chemically bonded coating on an aluminum article, which comprises forming a colored conversion coating on said article, said coating containing a yellow hexavalent chromium material, and contacting said colored conversion coating with an aqueous solution consisting essentially of a soluble agent capable of discharging the yellow color of said hexavalent chromium material present in the conversion film, said color discharge agent reacting chemically with the hexavalent chromium to form a substantially colorless reaction product, and substantially discharging the color from said conversion coating, said color discharge agent being one capable of producing a visible discoloration from a colored conversion coating when immersed in a 2% aqueous solution of said agent at a treatment temperature of 120° F. for a period not more than 15 minutes.

2. A process as defined in claim 1, wherein said agent is a member of the group consisting of soluble sulfur-containing compounds soluble phosphorus-containing compounds, soluble ferrocyanides, soluble divalent and trivalent chromium compounds, hydroquinone, quinhydrone and hydrazines.

3. A process as defined in claim 1, wherein said agent is a member of the group consisting of alkali metal and ammonium ferrocyanides, hypophosphites, thiosulphates, phosphorous acid, chromic nitrate, hydrazine sulphate and hydroquinone.

4. A process as defined in claim 1, wherein said agent is potassium ferrocyanide.

5. A process as defined in claim 1, wherein said agent is sodium hypophosphite.

6. A process as defined in claim 1, wherein said agent is sodium thiosulphate.

7. A process as defined in claim 1, wherein said agent is hydroquinone.

8. A process as defined in claim 1, wherein the amount of said agent employed is between about 0.1 and about 100 grams per liter of solution.

9. A process as defined in claim 1, wherein the amount of said agent employed is between about 1 and about 50 grams per liter of solution.

10. A process for producing a substantially colorless chemically bonded coating on an aluminum article which comprises treating said article with an aqueous acid aluminum conversion coating bath, said bath comprising a halogen-containing anion and an anion containing hexavalent chromium, forming a colored conversion coating on said article, said conversion coating containing yellow hexavalent chromium material, and contacting said colored conversion coating with an aqueous solution consisting essentially of a soluble agent capable of discharging the yellow color of said hexavalent chromium material present in the conversion film, said color discharge agent reacting chemically with the hexavalent chromium to form a substantially colorless reaction product, and substantially discharging the color from said conversion coating, the amount of said agent employed being between about 0.1 and about 100 grams per liter of solution, said color discharge agent being one capable of producing a visible discoloration from a colored conversion coating when immersed in a 2% aqueous solution of said agent at a treatment temperature of 120° F. for a period not more than 15 minutes.

11. A process as defined in claim 10, wherein said agent is an alkali metal ferrocyanide.

12. A process as defined in claim 10, wherein said agent is an alkali metal thiosulphate.

13. A process as defined in claim 10, wherein said agent is an alkali metal hypophosphite.

14. A process as defined in claim 10, wherein the amount of said agent employed is about 2 to about 20 grams per liter of solution.

15. A process as defined in claim 10, wherein said agent is a member of the group consisting of alkali metal and ammonium ferrocyanides, hypophosphites, and thiosulphates, phosphorous acid, chromic nitrate, hydrazine sulphate and hydroquinone, and the amount of said agent employed is about 2 to about 20 grams per liter of solution.

16. A process for producing a substantially colorless chemically bonded coating on an aluminum article, which comprises treating said article with an aqueous acid aluminum conversion coating bath, said bath comprising a fluorine-containing anion, an anion containing hexavalent chromium, and a member of the group consisting of beryllium, magnesium, calcium, strontium and barium, forming a colored conversion coating on said article, said conversion coating containing a yellow hexavalent chromium material, and contacting said colored conversion coating with an aqueous solution consisting essentially of a soluble agent capable of discharging the yellow color of said hexavalent chromium material present in the conversion film, said color discharge agent reacting chemically with the hexavalent chromium to form a substantially colorless reaction product, and substantially discharging the color from said conversion coating, the amount of said agent employed being between about 0.1 and about 100 grams per liter of solution, said color discharge agent being one capable of producing a visible discoloration from a colored conversion coating when immersed in a 2% aqueous solution of said agent at a treatment temperature of 120° F. for a period not more than 15 minutes.

17. A process as defined in claim 16, wherein said agent is a member of the group consisting of alkali metal and ammonium ferrocyanides, hypophosphites, and thiosulphates, phosphorous acid, chromic nitrate, hydrazine sulphate and hydroquinone, and the amount of said agent employed is about 0.1 to about 100 grams per liter of solution.

18. A process for producing a substantially colorless chemically bonded coating on an aluminum article, which comprises forming a colored conversion coating on said article, said coating containing a yellow hexavalent chromium material, and contacting said colored conversion coating with an aqueous solution of hydrazine sulfate, and substantially discharging the color from said conversion coating.

19. A process for producing a substantially colorless chemically bonded coating on an aluminum article which comprises treating said article with an aqueous acid aluminum conversion coating bath, said bath comprising a halogen-containing anion and an anion containing hexavalent chromium, forming a colored conversion coating on said article, said conversion coating containing yellow hexavalent chromium material, and contacting said colored conversion coating with an aqueous solution of a member of the group consisting of hydrazine hydrate and hydrazine sulfate, and substantially discharging the color from said conversion coating, the amount of said member employed being between about 0.1 and about 100 grams per liter of solution.

References Cited in the file of this patent

UNITED STATES PATENTS

| | | |
|---|---|---|
| 2,296,884 | Thompson | Sept. 29, 1942 |
| 2,346,609 | Riggs et al. | Apr. 11, 1944 |
| 2,502,441 | Dodd et al. | Apr. 4, 1950 |
| 2,796,371 | Ostrander et al. | June 18, 1957 |